United States Patent [19]

Little

[11] Patent Number: 4,954,258
[45] Date of Patent: Sep. 4, 1990

[54] MICROBIOLOGICAL DEGRADATION OF HALOGENATED HYDROCARBONS IN WATER

[76] Inventor: C. Deane Little, 619 Watson Ave., Pensacola, Fla. 32503

[21] Appl. No.: 269,642

[22] Filed: Nov. 10, 1988

[51] Int. Cl.$^5$ .............................. C02F 3/00; C02F 3/02
[52] U.S. Cl. .................................. 210/611; 210/610; 210/601; 435/262; 435/264
[58] Field of Search ................. 435/264, 262; 210/611

[56] References Cited

PUBLICATIONS

Galchenko et al–Chem. Abst. vol. 102 (1985) 3046e.
Mshenskii–Chem. Abst. vol. 104 (1986) p. 18620c.

*Primary Examiner*—Sam Rosen
*Attorney, Agent, or Firm*—Mathews, Woodbridge & Collins

[57] ABSTRACT

Halogenated aliphatic hydrocarbons in water are degraded by methanotrophic bacteria in the presence of oxygen and at least one lower alkanol as a carbon source.

7 Claims, No Drawings

MICROBIOLOGICAL DEGRADATION OF HALOGENATED HYDROCARBONS IN WATER

The present invention relates to improvements in the microbiological degradation of halogenated aliphatic hydrocarbons.

U.S. Pat. No. 4,713,343 to Wilson et al. describes the treatment of water such as ground water and drinking water contaminated with halogenated aliphatic hydrocarbons by cultivating a class of alkane-oxidizing microorganisms, classified as methanotrophs, in the presence of added oxygen and an alkane such as methane, ethane, n-propane, n-butane, or mixtures thereof. This approach represents an improvement over earlier processes for microbiological purification of water, such as those of U.S. Pat. Nos. 4,401,569, 3,979,283, 4,447,541, 4,452,894, 4385,121 (the disclosures of which are described by Wilson). It contains, however, a number of inherent problems which preclude its large scale implementation.

As noted, the process requires the use of an alkane and oxygen, a potentially explosive mixture. In fact, the preferred feed is stated by Wilson to be a mixture of natural gas and oxygen. Moreover, methane has a relatively low solubility in water, limiting the capacity of the system and requiring relatively large amounts of the alkane for a given quantity of water to be processed. This is further complicated by the necessity to employ a two-phase system which creates problems with control, mass transfer and system manipulations. Finally, and as described by the present inventor and co-workers, in both the alkane and the halogenated aliphatic hydrocarbon bind to the same site of the enzyme methane monooxygenase, meaning the two required substances inherently establish competitive inhibition.

It also has been found that, contrary to expectation, an increase in the amount of methane introduced actually decreases the efficiency of the system. In fact, the addition of 20% methane will "shut down" the organism's ability to degrade halogenated hydrocarbons, perhaps explaining the failure of some researchers to observe degradation.

These disadvantages in the degradation of halogenated aliphatic hydrocarbons by aerobic growth of methanotrophic bacteria in the presence of a source of oxygen and an alkane can be overcome according to the present invention by replacing a substantial quantity of the alkane with at least a growth stimulating quantity of at least one lower alkanol as a carbon source. Preferably the lower alkanol is methanol and most preferably substantially all of the alkane, typically methane, is replaced with methanol, although relatively small amounts of methane can be added to stimulate the production of the methane monooxygenase enzyme One of the most frequently identified halogenated aliphatic hydrocarbon contaminants at hazardous waste sites is 1,1,2-trichloroethylene, to which reference will be made herein, although the water can be treated for one or more other related contaminants such as dichloromethane, carbon tetrachloride, 1,2-dibromoethane, 1,2-dichloroethane, 1,1-dichloroethane, 1,1, 2-trichloroethane, 1,1,1-trichloroethane, 1,2-dichloroethylene, tetrachloroethylene, and vinyl chloride.

The use of an alkanol in place of an alkane as the principal carbon source has a number of advantages. Methanol when sufficiently diluted with water is not flammable, thus eliminating the risk of fire and explosion associated with the use of methane and other alkanes. The lower alkanols are much more soluble in water, again in contrast to the hydrophobic alkanes, and attaining practical concentrations is not a limiting factor. Methanol in particular is totally miscible with water. Finally alkanols, unlike alkanes, do not bind substantially to methane monooxygenase, the enzyme responsible for degrading the halogenated aliphatic hydrocarbons. Instead alkanols are metabolized by methanol dehydrogenase, meaning their use does not compete with the enzymatic degradation of the halogenated aliphatic hydrocarbons by methane monooxygenase The process can be practiced in its most direct fashion by simply adding methanol to the water to be treated under appropriate temperature, pH and nutrient conditions for the growth stimulation of methanotrophs, and in some cases supplements by inoculating the resulting mixture with one or more of the appropriate microorganisms in the presence of oxygen or a source of oxygen such as a peroxide Appropriate organisms include those reported in Reference *Appl. Environ. Microbiol.*, 54:951–956 (1988), specifically strain 46. The process can be conducted either in situ or by removing the water from the contaminated zone for processing in appropriate water treatment facilities such as flow-through columns or bioreactors. Obviously the process also can be used to detoxify waste water generated at industrial operations even prior to release into the environment.

The methanotrophic microorganisms suitable for use occur widely in nature and are characterized by their ability to produce methane monooxygenase They can be readily obtained from methane-enriched groundwater cultures, by culturing on mineral salts-agarose plates in the presence of methane. Heterotrophic bacteria which are present with the initial colonies and capable of utilizing other carbon sources such as nutrient agar or yeast extract, can be eliminated simply by repeated culturing in the presence of mineral salts but in the absence of a carbon source other than methane-containing atmosphere, followed by colony isolation. If the initial sample contains suitable methanotroph strains, homogeneous cell and colony morphologies should be observed following a number of such single colony transfers.

While isolation of pure methanotrophic strains is useful for the identification of suitable cultures, it is not always necessary for practice of the process of this invention. In fact, the use of mixed methane-oxidizing cultures often is desirable in order to provide a higher degree of degradation. Hence incubation of $^{14}C$ labelled trichloroethylene in one pure culture produced carbon dioxide and stable, water soluble products which were identified by ion chromatography as glyoxylic acid and dichloroacetic acid. The accumulation of these products suggests that while the methanotrophs can initiate oxidation of halogenated aliphatic hydrocarbons in a cometabolic process, they cannot completely metabolize molecules containing more than one carbon atom.

The acid materials so formed are readily removed from the water, as for example through the use of ion exchange resins. Alternatively, mixed cultures containing both the methanotrophs and heterotrophic bacteria (which are known to metabolize such water-soluble products) will result in further degradation of these acidic products.

Alternatively, the degradation can be conducted in a multi-stage operation, with the contaminated water first being subjected to the action of a pure culture of methanotrophic bacteria in the presence of methanol to initiate TCE degradation, and then to the action of a heterotrophic culture to complete the degradation process.

Because organisms other than methanotrophs may metabolize methanol, it often is desirable, moreover, to initiate the process with methane in order to stimulate the growth of the methanotrophs and then replace methane introduction by the introduction of methanol as the degradation proceeds The following are typical procedures:

A. Groundwater Sampling

Groundwater samples were obtained from monitoring wells at a waste disposal site near Oak Ridge, Tenn. Levels of individual chlorinated organics in groundwater at the site range from a few micrograms/liter to over 100 mg/liter.

Water samples were collected by nitrogen displacement with a sampling device (Well Wizard 3013: Q.E.D. Environmental Systems, Inc., Ann Arbor, Mich.) in sterile flasks after well lines had been pumped forcibly for several cycles. Samples were stirred and vented for several hours in a laboratory hood to remove volatile organic contaminants.

A typical analysis of such samples showed the following ranges in composition: dissolved oxygen, 3.6 to 5.3 mg/liter; pH, 5.7 to 6.0; total chlorinated alkenes, 1.579 to 2.286 g/liter.

B-1. Mixed Methane-oxidizinq Cultures

Mixed bacterial cultures were grown by combining well water as above with mineral salts concentrate (total liquid volume, 100 ml) in 250-ml septum bottles The mineral salts concentrate was adapted from that of Whittenbury et al., *J. Gen. Microbiol.*, 61:205–218, diluted with well water to obtain the following concentrations per liter: 1 g of $MgSO_4.7H_2O$, 0.2 g of $CaCl_2$, 1 g of $KNO_3$, 0.1 g of $NH_4Cl$, 50 g of $CuSO_4.5H_2O$, 70 g of $Zn(NO_3)_2.6H_2O$, and 10 g each of $H_2BO_3$, $MnSO_4.H_2O$, $MoO_3$, and $CoCl_2.6H_2O$. Twenty milliliters of 5% phosphate buffer (pH 6.8) and 10 ml of a 0.27 g/liter $FeCl_3$ solution were added per liter of heat-sterilized medium when cool. Filter-sterilized methane gas (15 ml. 0.67 mmol) was injected to obtain a 10% (vol/vol) methane atmosphere in the headspace of the bottle Bottles were incubated at 22° C. on a shaker table. Bacterial growth was generally visible 1 to 3 weeks after such cultures were initiated.

B-2. Pure Methanotrophic Strains

Pure strains of methane-oxidizing bacteria can be isolated from mixed cultures on mineral salts-agarose plates incubated at 22° C. in a 10% methane atmosphere. Criteria used to determine strain purity included (i) repeated colony isolation; (ii) constant, homogeneous colony morphologies; (iii) homogeneous cell morphology (determined by transmission electron microscopy); and (iv) the complete absence of growth on carbon substrates other than methane or methanol. Strain purity was checked periodically throughout these experiments by streaking methanotroph cultures on dilute yeast extract or nutrient agar plates and was confirmed at the end of several trichloroethylene degradation assays that showed substantial trichloroethylene biodegradation.

C. Methanol Assisted Degradation of Trichloroethylene

Mixed samples from four wells as above were cultured as described in B-1 above with methanol as the sole carbon source. Initial levels of trichloroethylene were fixed at 610 g/l Degradation was observed as follows:

| Initial TCE Conc. g/l | Final TCE Conc. g/l | Days |
|---|---|---|
| 610 | <100 | 9 days |
| 610 | 150 | 14 days |
| 610 | 250 | 18 days |
| 610 | 75 | 10 days |

The average decrease in halogenated hydrocarbon was thus 76.4%

D. Trichloroethylene Degradation Assays

Trichloroethylene degradation assays were conducted in 250-ml septum bottles containing 100 ml of liquid culture. Trichloroethylene biodegradation was quantified by headspace gas chromatography (GC) and $^{14}C$ radiolabel analysis. Teflon-lined septum-cap bottles containing pure or mixed methane-oxidizing cultures were dosed with $[1,2-^{14}C]$ trichloroethylene (3.0 mCi/mmol[111 MBq/mmol] supplemented with reagent grade trichloroethylene to a total nominal concentration of 400 g/liter. This level was chosen as typical of groundwater contamination levels at the collection site. Each bottle received 20 mg of methanol Radiolabeled trichloroethylene was shown by gas chromatograph to be 98% radiochemically pure as measured with a gas-proportional radiation detector and by quantifying $^{14}C$ in trapped fractions of gas chromatograph column effluent by liquid scintillation spectrometry Bottles containing liquid culture and $[^{14}C]$trichloroethylene were inverted and incubated on a shaker table at 22° C. Duplicate culture bottles were sacrificed at periodic intervals for cell counting, gas chromatograph, and radiolabel analysis. Autoclaved cultures were incubated concurrently and sacrificed at intervals to serve as controls.

Trichloroethylene concentrations in culture bottle headspace samples were determined with a 3920 gas chromatograph (Perkin-Elmer) equipped with an electron capture detector and an SP-1000 column (6 mm [inside diameter]by 1.8 m) held at 120° C. with nitrogen (50 ml/min) as the carrier gas. Headspace trichloroethylene levels were shown to be directly related to water concentrations over the concentration range employed in experiments.

Radiolabel accumulation was measured in washed cells, $CO_2$ traps, and cell-free, hexane-extracted culture liquid. After incubation, culture liquid pH was adjusted to between pH 9 and pH 10 with 1 N NaOH, and bottles were shaken overnight to trap $CO_2$ in the medium. Culture samples (50 ml) were then centrifuged on a tabletop centrifuge to sediment cells. Cells were washed with 40 ml of medium, centrifuged, and resuspended in 10 ml of medium. The cell suspension was adjusted to pH 8.5 with 1 N HCl, and $^{14}C$ accumulation was determined by liquid scintillation spectrometry. The supernatant was extracted with 20 ml of hexane to remove trichloroethylene and acidified in a closed container, and $^{14}CO_2$ was trapped overnight in a 40 ml vial containing 9 ml of 0.1 N NaOH. Tests with $NaH^{14}CO_3$ demonstrated that trapping efficiency was greater than 99%. Trap liquid pH was adjusted to 8.5, and radio label accumulations in $CO_2$ traps and extracted supernatant were determined by liquid scintillation spectrometry.

E. Ion Chromatography of Trichloroethylene Breakdown Products

Cell-free, hexane-extracted culture liquid was concentrated by vacuum rotary evaporation at 55° C. The concentrate was injected on a 4000I ion chromatograph (Dionex) equipped with an AS1 micromembrane column. The column effluent was collected at 1-min intervals, and the amount of $^{14}C$ in each fraction was determined by liquid scintillation spectrometry. A variety of short-chain organic acids considered to be likely trichloroethylene breakdown products were assayed by ion chromatography for comparison of retention times The water-soluble trichloroethylene breakdown products were nonvolatile at pH 7 and were not hexane extractable. Ion chromatography of the water-soluble breakdown products revealed two radiolabeled products, one eluting at 6 to 7 min and the other eluting at 10 to 11 min. No other effluent fractions shown a detectable elevation of radiolabel. A variety of short-chain acids considered to be possible trichloroethylene breakdown products were assayed by ion chromatography as standards. These included acetic acid, formic acid, glyoxylic acid, monochloroacetic acid, dichloroacetic acid, and trichloroacetic acid. The materials formed were identified as glyoxylic acid and dichloroacetic acid.

What is claimed is:

1. In the process of degrading halogenated aliphatic hydrocarbons by the aerobic growth in water of methanotrophic bacteria in the presence of a source of oxygen and an alkane as the principal carbon source, the improvement which comprises substituting at least a growth stimulating quantity of at least one lower alkanol as a carbon source for a substantial quantity of said alkane.

2. The process according to claim 1 wherein said lower alkanol is methanol.

3. The process according to claim 2 wherein all of said alkane is replaced with methanol.

4. The process according to claim 2 wherein said aerobic growth is initiated in the presence of methane followed by the replacement, or partial replacement, of methane introduction by methanol introduction.

5. The process according to claim 1 wherein said halogenated aliphatic hydrocarbons includes at least one member selected from the group consisting of dichloromethane, carbon tetrachloride, 1,2-dibromoethane, 1,2-dichloroethane, 1,1-dichloroethane, 1,1,2-trichloroethane, 1,1,1-trichloroethane, 1,2-dichloroethylene, 1,1,2-trichloroethylene, tetrachloroethylene, and vinyl chloride.

6. The process according to claim 4 wherein said halogenated aliphatic hydrocarbons includes at least 1,1,2-trichloroethylene.

7. The process of degrading 1,1,2-trichloroethylene in water by allowing at least one methanotrophic bacteria to grow in the water in the presence of a source of oxygen and at least a growth stimulating quantity of methanol as substantially the sole source of carbon.

* * * * *